United States Patent
Grattan et al.

(10) Patent No.: US 11,180,198 B2
(45) Date of Patent: Nov. 23, 2021

(54) VEHICLE STRUCTURAL ASSEMBLY

(71) Applicant: Nissan North America, Inc., Franklin, TN (US)

(72) Inventors: Patrick Grattan, Wixom, MI (US); Nicholas Bulski, Berkley, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 179 days.

(21) Appl. No.: 16/571,726

(22) Filed: Sep. 16, 2019

(65) Prior Publication Data

US 2021/0078642 A1 Mar. 18, 2021

(51) Int. Cl.
 *B62D 27/02* (2006.01)
 *B62D 25/02* (2006.01)
 *B62D 25/04* (2006.01)

(52) U.S. Cl.
 CPC .......... *B62D 27/02* (2013.01); *B62D 25/025* (2013.01); *B62D 25/04* (2013.01)

(58) Field of Classification Search
 CPC ...... B62D 27/02; B62D 25/025; B62D 25/04; B62D 27/00
 See application file for complete search history.

(56) References Cited

U.S. PATENT DOCUMENTS

| | | | |
|---|---|---|---|
| 3,528,699 A | 9/1970 | Wessells, III | |
| 4,252,364 A | 2/1981 | Toyama et al. | |
| 4,944,553 A | 7/1990 | Medley et al. | |
| 7,828,357 B2 * | 11/2010 | Hayashi | B62D 25/06 296/29 |
| 9,493,190 B1 | 11/2016 | Alwan et al. | |
| 9,738,316 B2 * | 8/2017 | Emura | B62D 21/02 |
| 2006/0066135 A1 * | 3/2006 | Yatabe | B62D 25/06 296/203.01 |
| 2008/0178467 A1 * | 7/2008 | Hayashi | B62D 25/06 29/897.2 |
| 2010/0259072 A1 * | 10/2010 | Mizohata | B62D 25/02 296/203.03 |
| 2011/0175337 A1 | 7/2011 | Favaretto | |
| 2015/0021954 A1 * | 1/2015 | Hayakawa | B62D 25/2036 296/187.12 |
| 2016/0107698 A1 * | 4/2016 | Oshima | B62D 21/157 296/187.12 |
| 2016/0214649 A1 * | 7/2016 | Emura | B62D 25/04 |
| 2018/0370572 A1 * | 12/2018 | Sekiya | B62D 27/00 |

FOREIGN PATENT DOCUMENTS

| | | | | |
|---|---|---|---|---|
| DE | 10118202 A1 * | 3/2002 | ........ | B62D 25/2036 |
| DE | 102008057352 A1 * | 5/2009 | ............ | B62D 25/08 |
| EP | 1127776 A2 * | 8/2001 | ............ | B62D 27/00 |
| EP | 2345573 A1 | 7/2011 | | |

* cited by examiner

*Primary Examiner* — Lori L Lyjak
(74) *Attorney, Agent, or Firm* — Global IP Counselors, LLP

(57) ABSTRACT

A vehicle structural assembly includes at least a first member and a second member each having overlapping area. The overlapping area of the first member overlays the overlapping area of the second member where the first member and second member are welded to one another. The overlapping area of the first member defines an overlap extension and the overlapping area of the second member define another overlap extension.

15 Claims, 12 Drawing Sheets

VEHICLE STRUCTURAL ASSEMBLY

BACKGROUND

Field of the Invention

The present invention generally relates to a vehicle structural assembly. More specifically, the present invention relates to a vehicle structural assembly that includes a first member and a second member welded to one another with overlapping surface areas.

Background Information

The design and assembly of vehicle structural assemblies is constantly evolving.

SUMMARY

One object of the present disclosure is to provide a vehicle structural assembly with a stronger connection between elements that make up the vehicle structural assembly. In view of the state of the known technology, one aspect of the present disclosure is to provide a vehicle structural assembly with a main member, a first member and a second member. The main member has a first main flange, a second main flange and a main central section that extend in a lengthwise direction thereof. The first member has a first flange, a second flange and a first central section the first flange and the second flange extending along opposite sides of the first central section in a lengthwise direction thereof. The first central section defines a first overlapping area. The second member has a third flange, a fourth flange and a second central section. The third flange and the fourth flange extend along opposite sides of the second central section in a lengthwise direction thereof. The second central section defines a second overlapping area. The first and second flanges of the first member are attached to corresponding ones of the first main flange and the second main flange along a first section of the main member. The third and fourth flanges of the second member are attached to corresponding ones of the first main flange and the second main flange along a second section of the main member. The first overlapping area overlaying the second overlapping area such that the second overlapping area is positioned between the first overlapping area and a corresponding area of the main member. At least one of the first overlapping area and the second overlapping area defines an overlap extension that extends from at least the one of the first central section and the second central section in a direction longitudinally away from end edges of a corresponding one of the first and second flanges, and, the third and fourth flanges.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
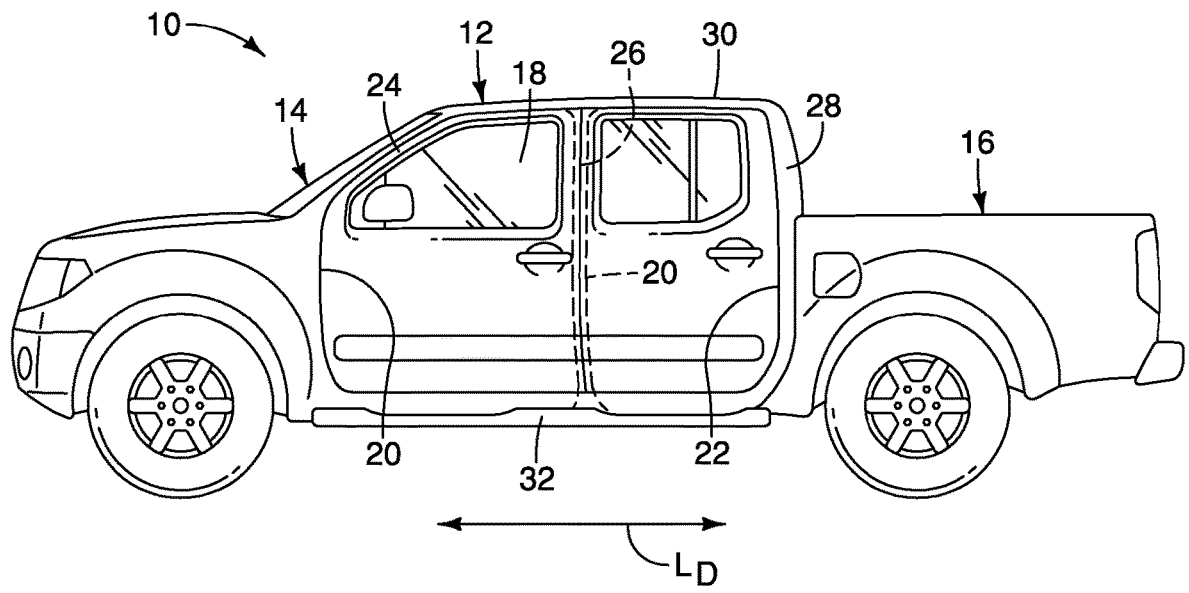
FIG. 1 is a side view of a vehicle that includes a sill assembly constructed from several separate panels in accordance with a first embodiment.

Referring initially to FIG. 1, a vehicle 10 is illustrated in accordance with a first embodiment. In the depicted embodiment, the vehicle 10 is a pickup truck with a vehicle body structure 12 that includes cabin structure 14 and a rear cargo area 16. The cabin structure 14 defines a passenger compartment 18.

Figure 2:
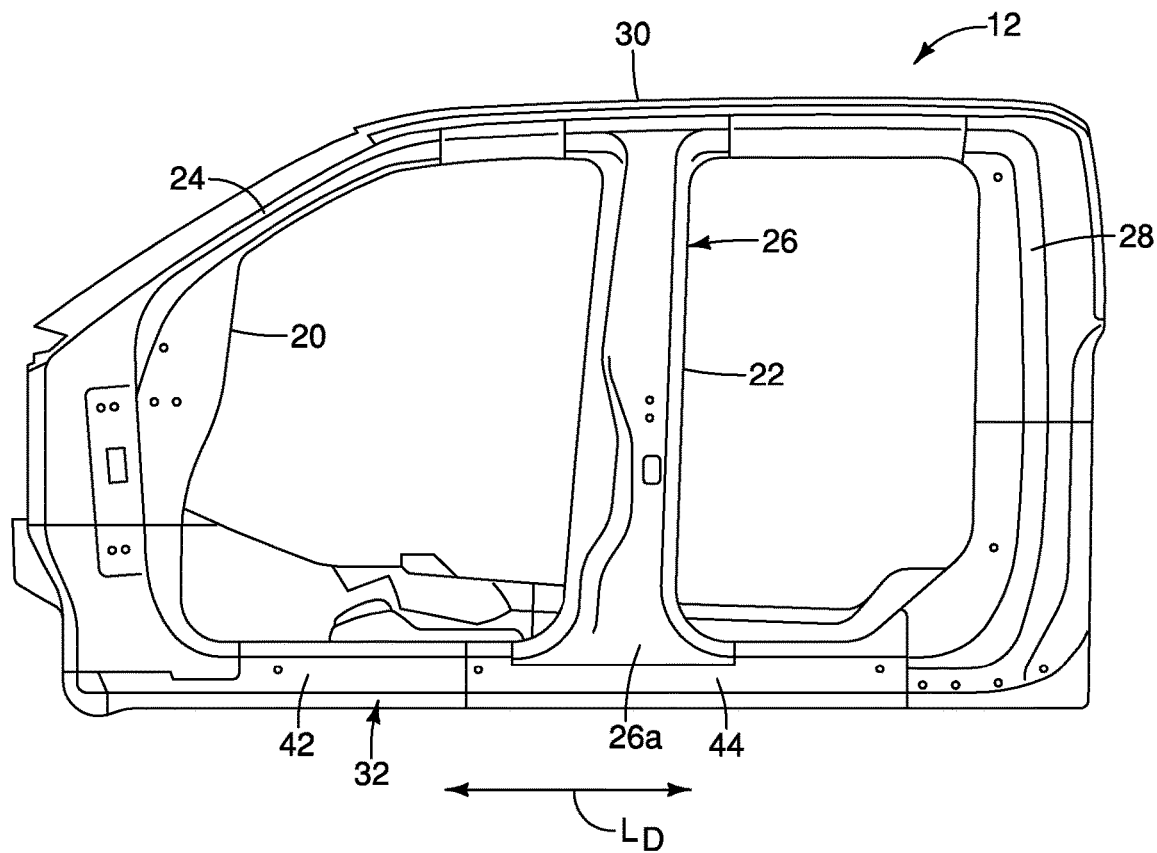
FIG. 2 is a side view of structures, including the sill assembly, that are assembled and fixed to one another defining a side assembly of the vehicle in accordance with the first embodiment.

The rear cargo area 16 is basically a pickup truck cargo bed. The cabin structure 14 defines a front door opening 20, a rear door opening 22, an A-pillar assembly 24, a B-pillar assembly 26, a C-pillar assembly 28, a roof structure 30 and a sill assembly 32 (also referred to as a vehicle structural assembly), as shown in FIGS. 2 and 3.

It should be understood from the drawings and the description hereinbelow, that the vehicle 10 can be any of a variety of vehicles, such as a sports utility vehicle (SUV), a sedan, a coupe or a van, and is not limited to a pickup truck vehicle design.

The A-pillar assembly 24, the B-pillar assembly 26, the roof structure 30 and the sill assembly 32 together define the front door opening 20. The B-pillar assembly 26, the C-pillar assembly 28, the roof structure 30 and the sill assembly 32 together define the rear door opening 22. The sill assembly 32 (also referred to as the vehicle sill assembly 32) extends along the lower edge of each of the front and rear door openings 20 and 22. As shown in FIG. 2, a lower end 26a of the B-pillar assembly 26 is fixed to a central area 32a of the sill assembly 32. The B-pillar assembly 26 includes at least an inner panel (FIG. 3) and an outer panel (FIG. 2). Since vehicle pillars, passenger compartments and pickup truck cargo beds are conventional structures, further description is omitted for the sake of brevity.

Figure 3:
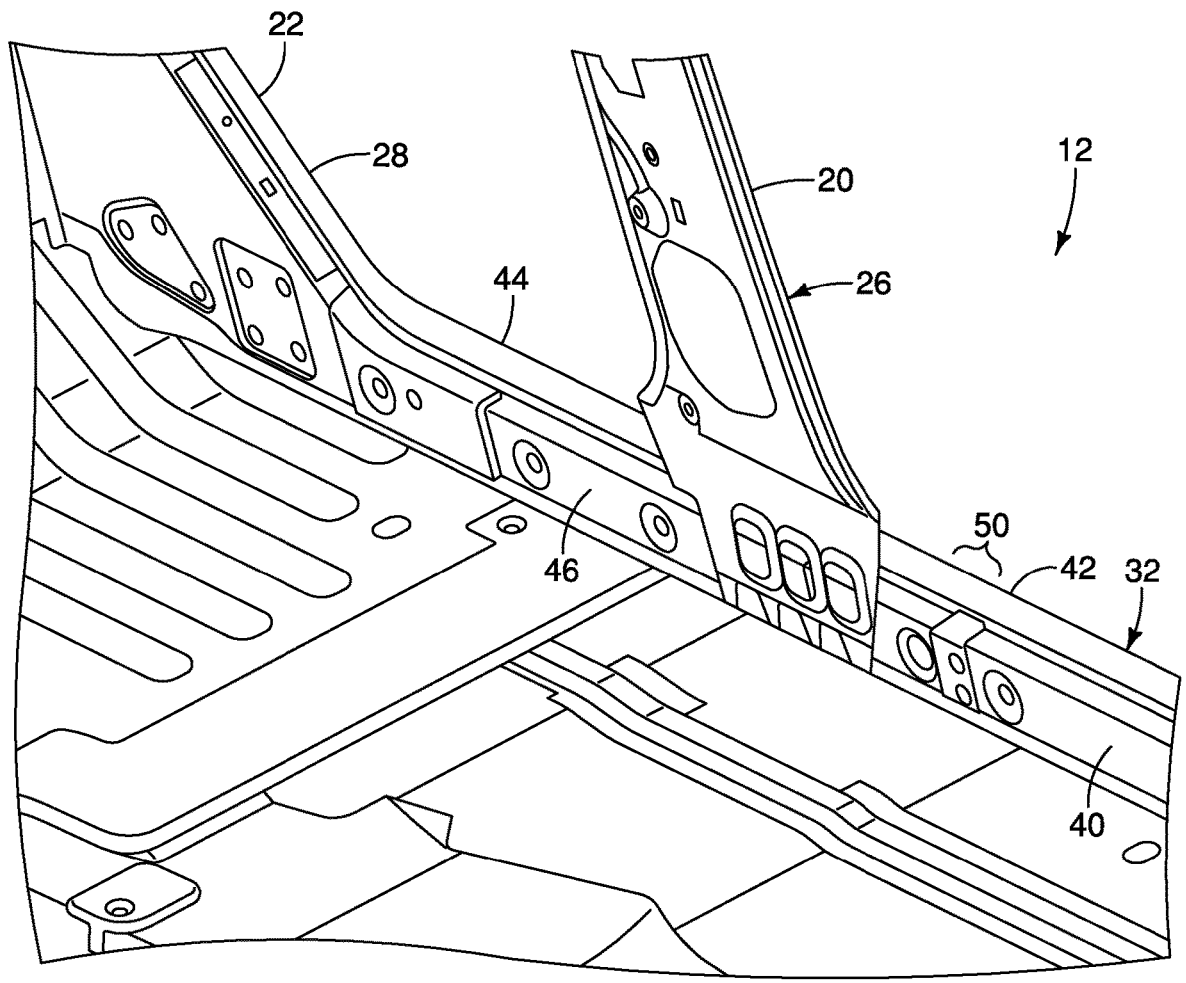
FIG. 3 a perspective view of interior surfaces of the side assembly and the sill assembly, showing a floor and structural elements of the vehicle in accordance with the first embodiment.
Figure 4:
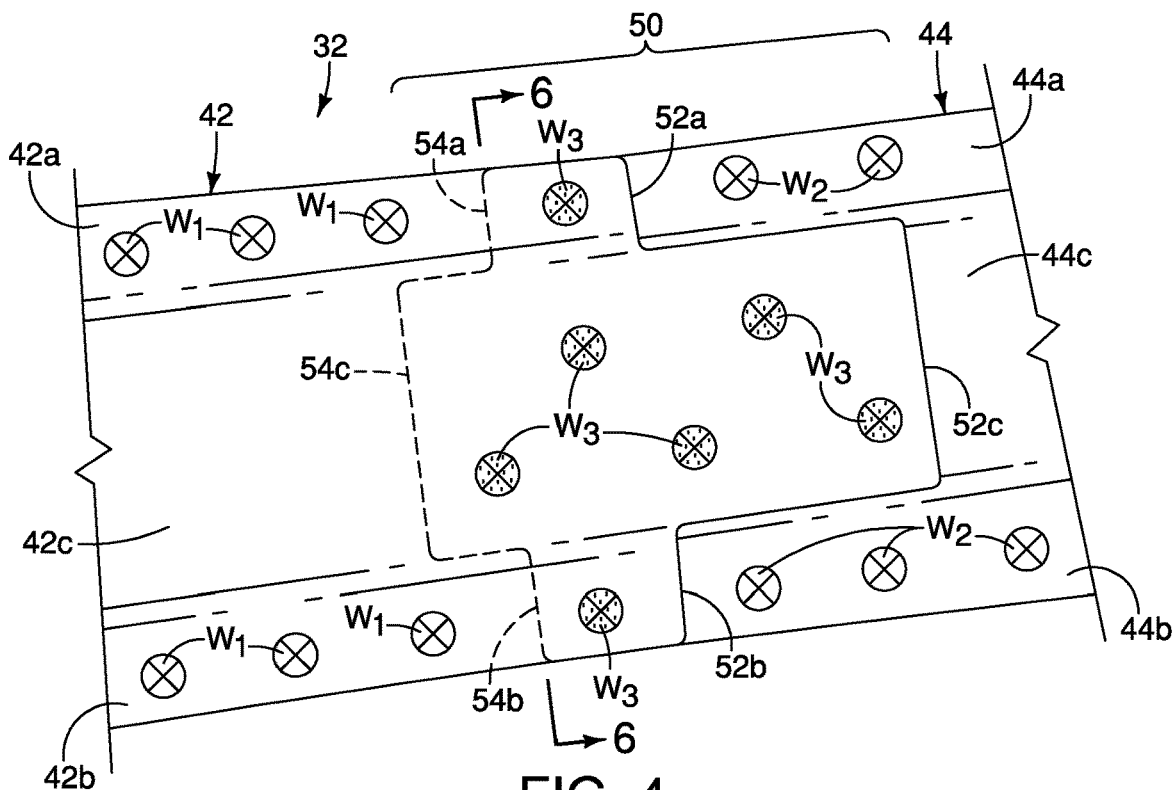
FIG. 4 is a side view of a portion of the sill assembly showing a first member and a second member overlapping one another and welded to one another defining an overlapping area in accordance with the first embodiment.

In the first embodiment shown in FIGS. 3-12, the sill assembly 32 is constructed from a plurality of contoured panels that include at least a main member 40, a first member 42, a second member 44 and a rear main member 46 (FIG. 3). The main member 40 and the rear main member 46 when welded together, define an inner sill panel. The first member 42 and the second member 44 define an outer sill panel that is subsequently welded to the inner sill panel, as described in greater detail below.

The first member 42 and the second member 44 are joined together in an overlapping area 50, as shown in FIGS. 4, 6-12, and described in greater detail below.

The main member 40 (part of the inner sill panel) includes a first main flange 40a, a second main flange 40b and a main central section 40c. The main central section 40c has an overall U-shape, as viewed in cross-section in FIG. 6. Each of the first main flange 40a, the second main flange 40b and the main central section 40c extends in a lengthwise direction $L_D$ of the sill assembly 32.

Figure 5:
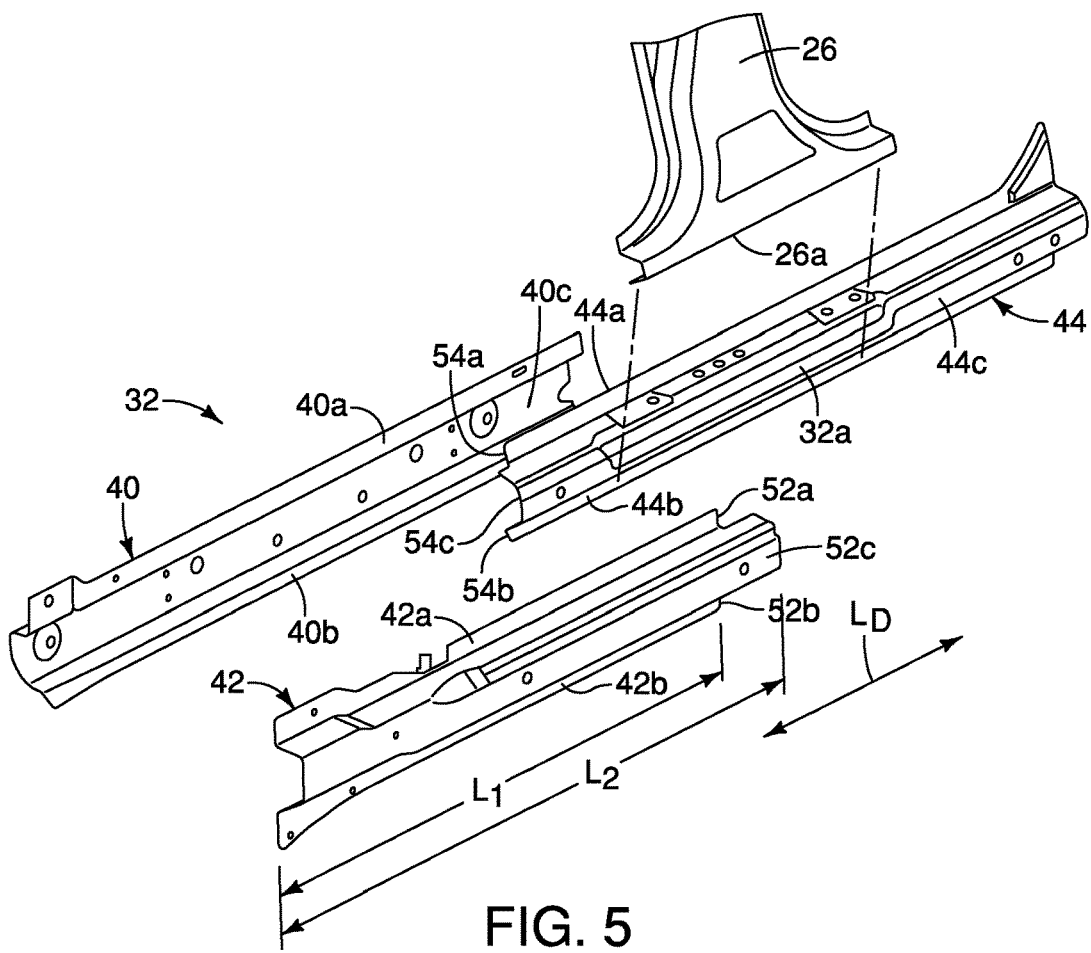
FIG. 5 is an exploded perspective view of the sill assembly and the B-pillar showing a main member, the first member and the second member of the sill assembly in accordance with the first embodiment.
Figure 6:
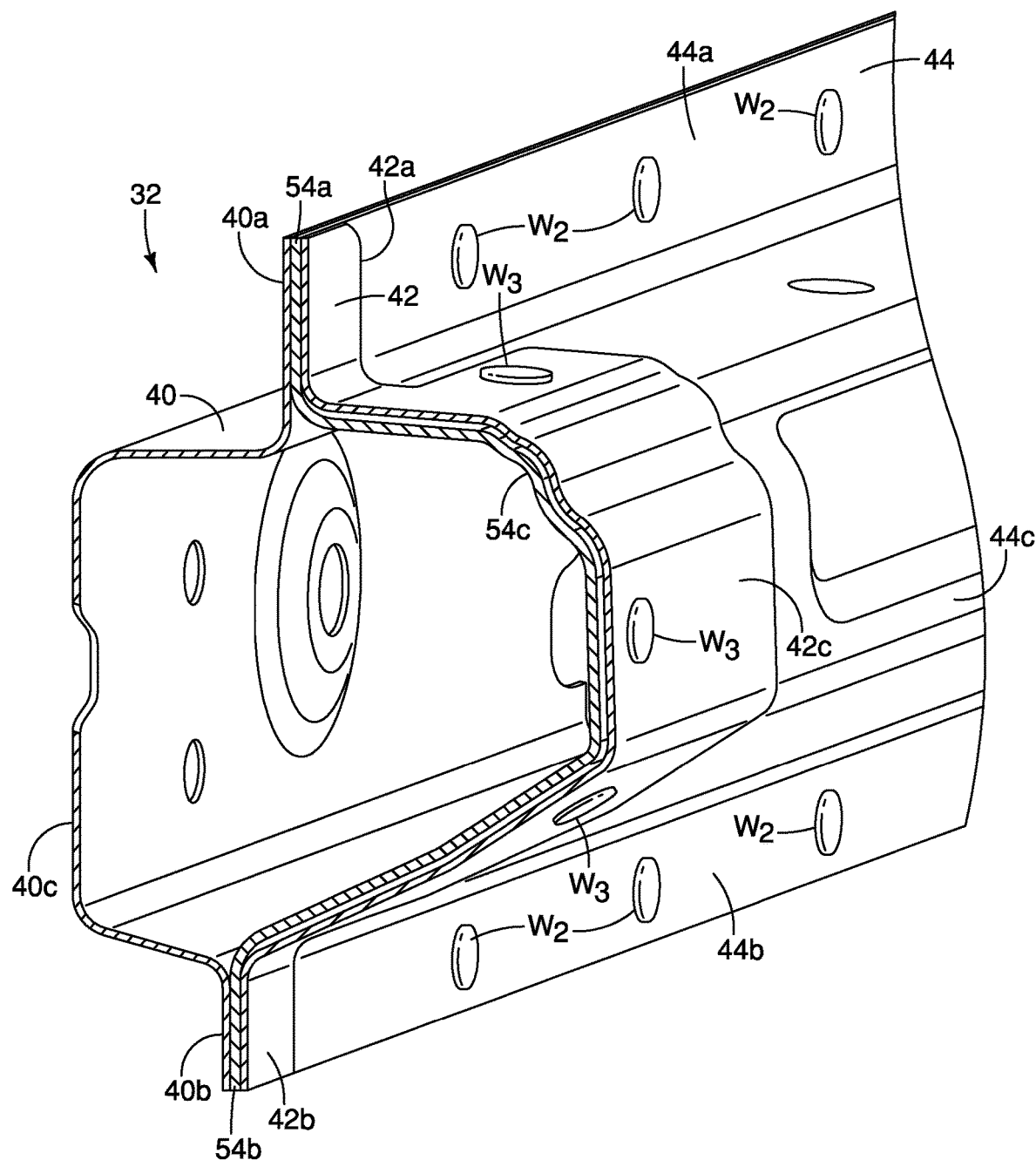
FIG. 6 is a perspective cross-sectional view showing details of the overlapping area of the sill assembly in accordance with the first embodiment.
Figure 7:
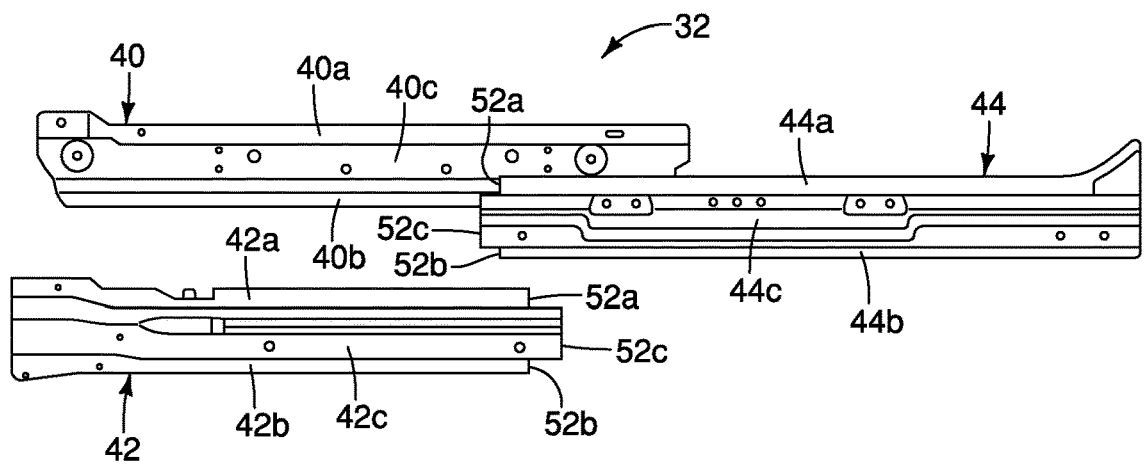
FIG. 7 is a side view of the sill assembly showing details of the main member, the first member and the second member in accordance with the first embodiment.
Figure 8:
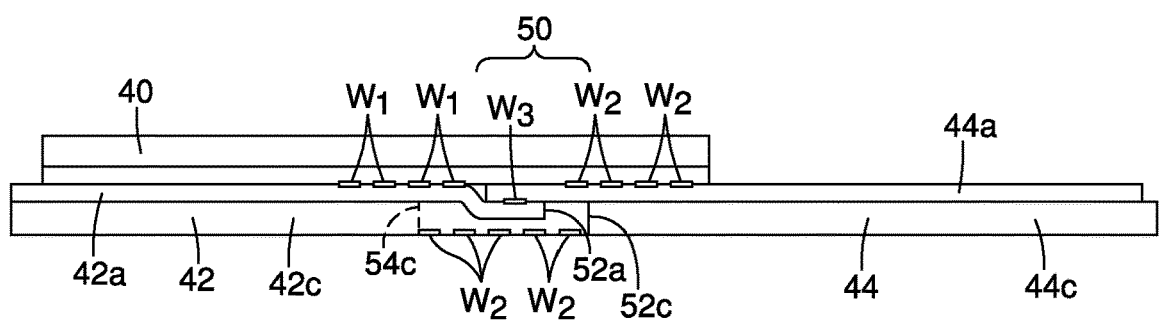
FIG. 8 is a top view of the sill assembly showing details of the overlapping area and the connections between the main member, the first member and the second member of the sill assembly in accordance with the first embodiment.
Figure 9:
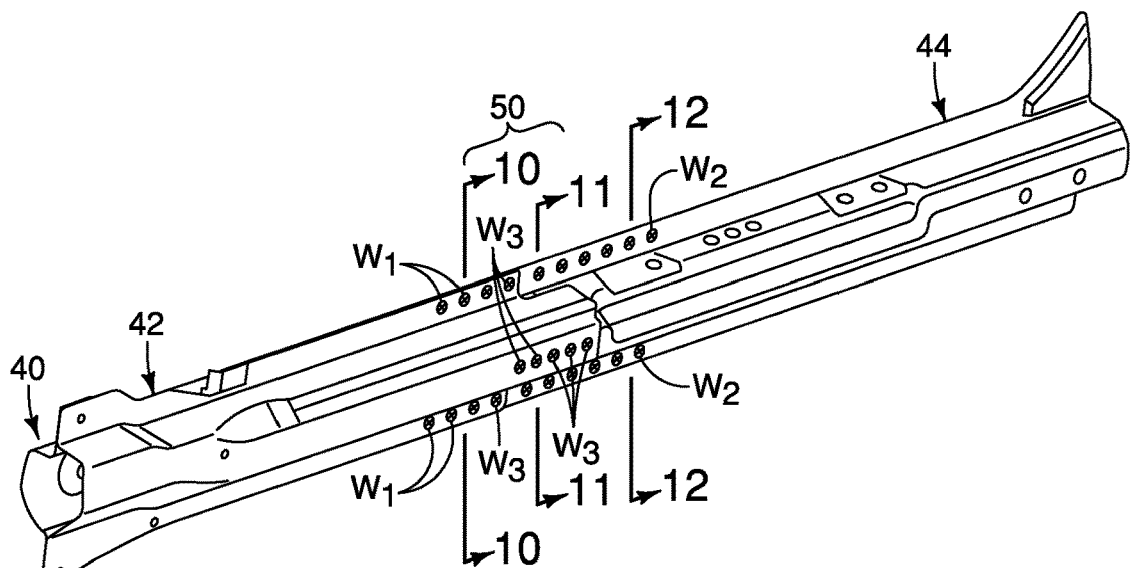
FIG. 9 is a perspective view of the fully assembles sill assembly in accordance with the first embodiment.
Figure 10:
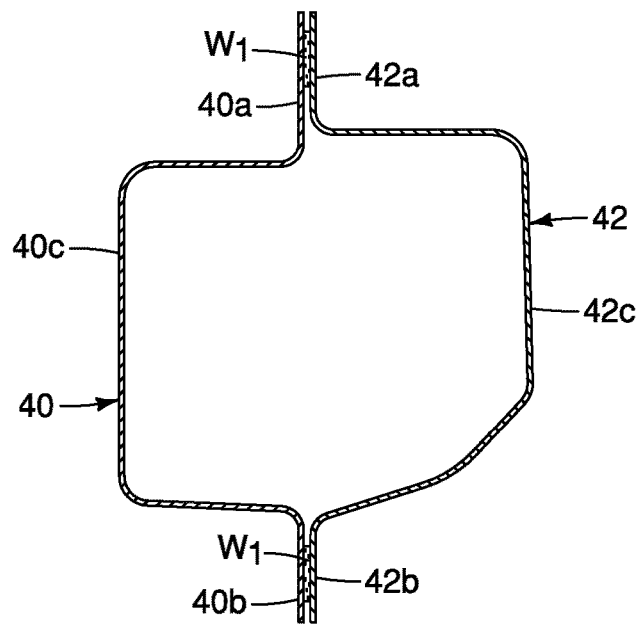
FIG. 10 is a cross-sectional view of a portion of the sill assembly taken along the line 10-10 in FIG. 9 showing welds that connect the main member with the first member in accordance with the first embodiment.
Figures 11, 12:
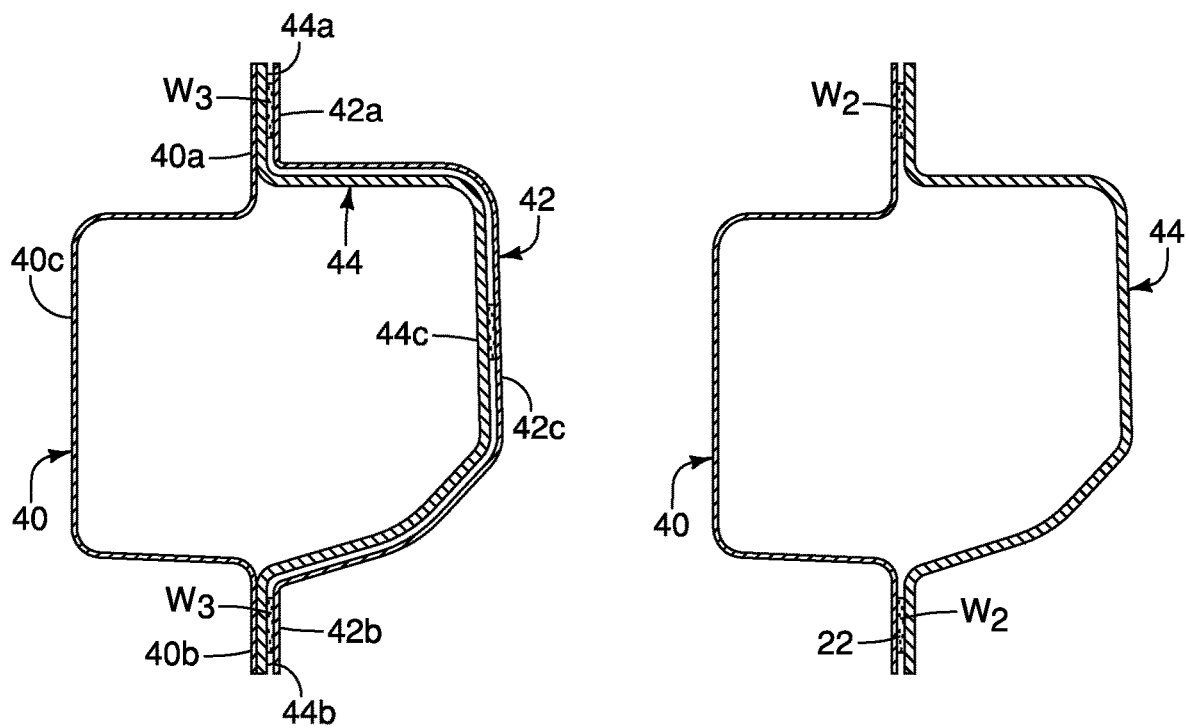
FIG. 11 is a cross-sectional view of a portion of the sill assembly taken along the line 11-11 in FIG. 9 showing welds that connect the first member with the second member in accordance with the first embodiment.
FIG. 12 is a cross-sectional view of a portion of the sill assembly taken along the line 12-12 in FIG. 9 showing welds that connect the first member with the second member in accordance with the first embodiment.

The first member 42 includes a first flange 42a, a second flange 42b and a central section 42c (also referred to as a first central section). A distal end of the first member 42 is provided with a predetermined overall shape. Specifically, the first flange 42a of the first member 42 has an overlap end 52a (a distal end thereof when not attached to the second member 44); the second flange 42b has an overlap end 52b and the central section 42c has an overlap end 52c. The central section 42c also has an overall U-shape as viewed in cross-section in FIG. 6. The central section 42c is longer than both the first and second flanges 42a and 42b, such that the overlap ends 52a and 52b are offset from the overlap end 52c of the central section 42c. More specifically, the central section 42c has an overall length $L_1$ as measured from a forward end thereof to the overlap end 52c. As shown in FIG. 5, the first and second flanges 42a and 42b both have an overall length $L_2$. The overall length $L_2$ is greater than the overall length $L_1$.

The portion of the central section 42c that extends from the overlap ends 52a and 52b to the overlap end 52c defines an overlap extension of the first member 42. This overlap extension at least partially defines the overlapping area 50.

The second member 44 includes a first flange 44a (also referred to as a third flange), a second flange 44b (also referred to as a fourth flange) and a central section 44c (also referred to as a second central section). A distal end of the second member 44 is provided with a predetermined overall shape. Specifically, the first flange 44a of the second member 44 has an overlap end 54a (a distal end thereof when not attached to the first member 42); the second flange 44b has an overlap end 54b and the central section 44c has an overlap end 54c. The central section 44c also has an overall U-shape as viewed in cross-section in FIG. 6. The central section 44a is longer than both the first and second flanges 44a and 44b, such that the overlap ends 54a and 54b are offset from the overlap end 54c of the central section 44a. More specifically, the central section 44a has an overall length as measured from a rearward end thereof to the overlap end 54c that is greater than an overall length of the first and second flanges 44a and 44b, as measured from a rearward end thereof to the overlap ends 54a and 54b. The portion of the central section 44c that extends from the overlap ends 54a and 54b to the overlap end 54c defines an overlap extension of the second member 44. This overlap extension at least partially defines the overlapping area 50.

The main member 40 and the first member 42 are preferably made of a standard strength metallic material. The second member 44 is made of a high strength metal and can therefore be thicker that the main member 40 and the first member 42.

As shown in FIG. 3, the first member 42 and the second member 44 together include surfaces that define the overlapping area 50 when the two are assembled and welded together. The overlapping area 50 basically extends from the overlap end 52c to the overlap end 54c.

Specifically, a portion of inboard surfaces of the central section 42c of the first member 42 that extends from the overlap end 52c to the overlap end 54c of the central section 44c of the second member 44 overlaps corresponding surfaces of a portion of the second member 44. The first member 42 is shown being outboard of the second member 44 in the overlapping area 50. Similarly, a portion of the first flange 42a of the first member 42 that extends from the overlap end 52a to the overlap end 54a of the first flange 44c of the second member 44 overlaps a corresponding portion of the second member 44. Similarly, a portion of the second flange 42b of the first member 42 that extends from the overlap end 52b to the overlap end 54b of the second flange 44b of the second member 44 overlaps a corresponding portion of the second member 44. It should be understood from the drawings and description herein that the main member 40 and the rear main member 46 are welded to one another and can include an overlapping area similar to the overlapping area 50. The overlap between the main member 40 and the rear main member 46 is at least partially concealed by the lower end 26a of the B-pillar 26. The overlap between the main member 40 and the rear main member 46 is located rearward of the overlapping area 50. Consequently, the overlap between the main member 40 and the rear main member 46 is staggered relative to the overlapping area 50.

As shown in FIGS. 4, 6 and 8-12, the first flange 42a and the second flange 42b of the first member 42 are attached via welds $W_1$ to corresponding ones of the first main flange 40a and the second main flange 40b of the main member 40. Similarly, the main section 42c of the first member 42 is welded to the main central section 40c of the main member 40 via welds $W_1$.

The first flange 44a and the second flange 44b of the second member 44 are attached via welds $W_2$ to corresponding ones of the first main flange 40a and the second main flange 40b of the main member 40. Further, various locations of the first member 42 are welded to the second member 44 via welds $W_3$.

As shown in FIGS. 6 and 9-12, the portion of the first member 42 within the overlapping area 50 (a first overlapping area) overlays a corresponding area of the second member 44 (the second overlapping area) such that the corresponding area of the second member 44 (the second overlapping area) is positioned between the first member 42 (the first overlapping area) and a corresponding area of the main member 40.

During a side impact event, where a point of contact between, for example, a vertical pole and the vehicle 10, impacting forces contacting the sill assembly 32 in the region of the overlapping area 50 are absorbed by the sill assembly 32. The extra strength provided by the second member 44 and the presence of the overlapping area 50 provides a stiffness to the sill assembly 32 that resists deformation.

The phrase "at least one of" as used in this disclosure means "one or more of" a desired choice. For example, the phrase "at least one of" as used in this disclosure means "only one single choice" or "both of two choices" if the number of its choices is two (i.e., at least one of A and B means a choice of only A, or only B, or A and B). As another example, the phrase "at least one of" as used in this disclosure means "only one single choice" or "any combination of equal to or more than two choices" if the number of its choices is equal to or more than three (i.e., at least one of A, B and C means a choice of only A, or only B, or only C, or only A and B, or only A and C, or only B and C, or A, B and C).

Second Embodiment

Figure 13:
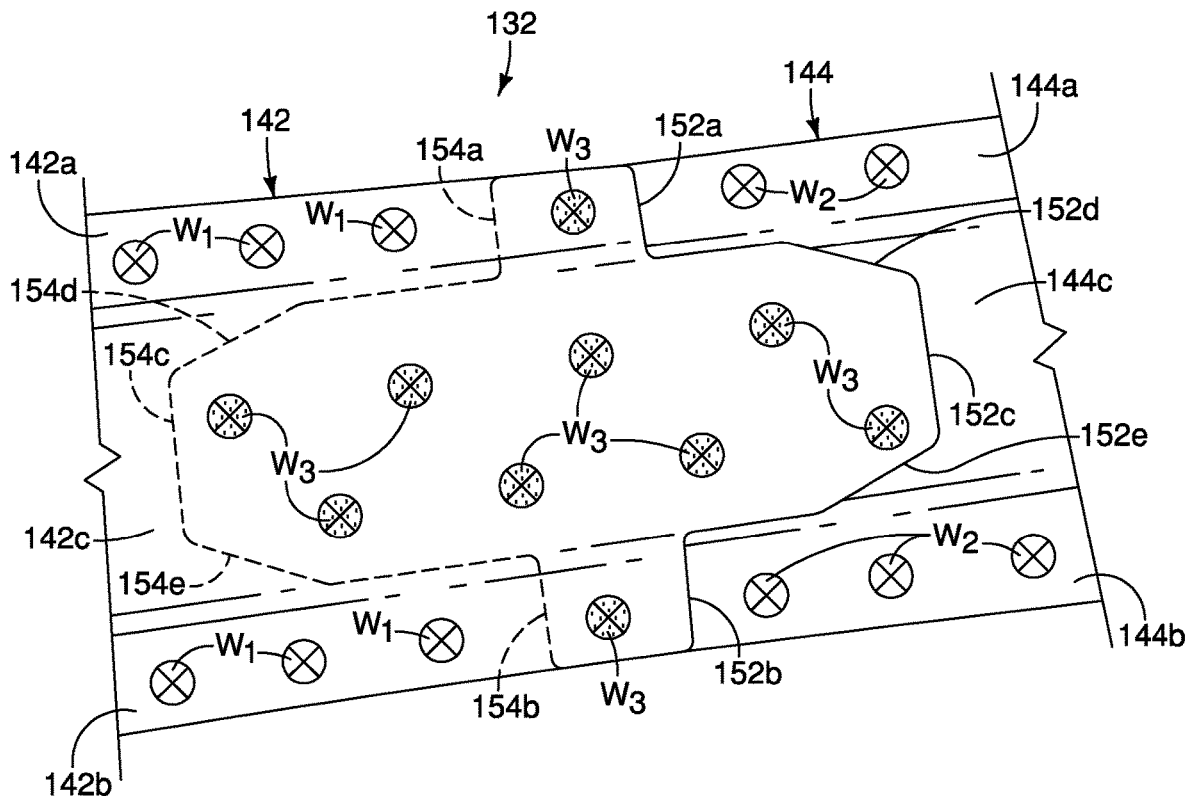
FIG. 13 is a side view of a portion of a sill assembly showing a first member and a second member overlapping one another and welded to one another defining an overlapping area in accordance with a second embodiment.
Figure 14:
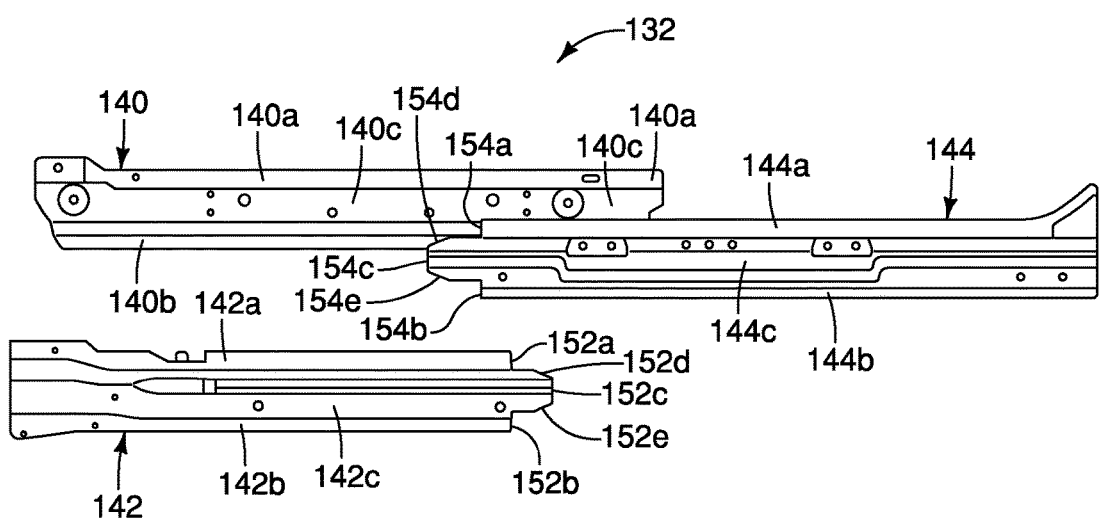
FIG. 14 is a side exploded perspective view of the sill assembly depicted in FIG. 13 showing a main member, the first member and the second member of the sill assembly in accordance with the second embodiment.

Referring now to FIGS. 13 and 14, a sill assembly 132 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The sill assembly 132 includes a main member 140, a first member 142 and a second member 144. The main member 140 is approximately the same as the main member 40 of the first embodiment. The main member 140 (FIG. 14)) includes a first main flange 140a, a second main flange 140b and a main central section 140c. The main central section 140c has an overall U-shape, as viewed in cross-section in FIG. 6. Each of the first main flange 140a, the second main flange 140b and the main central section 140c extends in a lengthwise direction $L_D$ of the sill assembly 132.

The first member 142 includes a first flange 142a, a second flange 142b and a central section 142c. A distal end of the first member 142 is provided with a predetermined overall shape. Specifically, the first flange 142a of the first member 142 has an overlap end 152a (a distal end thereof when not attached to the second member 144); the second flange 142b has an overlap end 152b and the central section 142c has an overlap end 152c. The central section 142c also has an overall U-shape as viewed in cross-section in FIG. 6. The central section 142a is longer than both the first and second flanges 142a and 142b, such that the overlap ends 152a and 152b are offset from the overlap end 152c of the central section 142a, as viewed from the side in FIGS. 13 and 14. The central section 142a further includes a first angled edge 152d and a second first angled edge 152e. The overlap end 152c is located between the first angled edge 152d and the second first angled edge 152e.

The first angled edge 152d and the second first angled edge 152e extend along opposite sides of the U-shape of the central section 142c, being angled as the extend toward respective ones of the first and second flanges 142a and 142b. Put another way, the first angled edge 152d and the second first angled edge 152e converge toward one another approaching the overlap end 152c of the central section 142c.

The second member 144 includes a first flange 144a, a second flange 144b and a central section 144c. A distal end of the second member 144 is provided with a predetermined overall shape. Specifically, the first flange 144a of the second member 144 has an overlap end 154a; the second flange 144b has an overlap end 154b and the central section 144c has an overlap end 154c. The central section 144c also has an overall U-shape. The central section 144a is longer than both the first and second flanges 144a and 144b, such that the overlap ends 154a and 154b are offset from the overlap end 154c of the central section 144a. More specifically, the central section 144a has an overall length as measured from a rearward end thereof to the overlap end 154c that is greater than an overall length of the first and second flanges 144a and 144b, as measured from a rearward end thereof to the overlap ends 154a and 154b.

The central section 144a further includes a first angled edge 154d and a second first angled edge 154e. The overlap end 154c is located between the first angled edge 154d and the second first angled edge 154e.

The first angled edge 154*d* and the second first angled edge 154*e* extend along opposite sides of the U-shape of the central section 142*c*, being angled as the extend toward respective ones of the first and second flanges 142*a* and 142*b*. Put another way, the first angled edge 154*d* and the second first angled edge 154*e* converge toward one another approaching the overlap end 152*c* of the central section 142*c*.

The main member 140 and the first member 142 are preferably made of a standard strength metallic material. The second member 144 is made of a high strength metal and can therefore be thicker that the main member 140 and the first member 142.

As shown in FIG. 13, the first member 142 and the second member 144 together define an overlapping area when the two are assembled and welded together. The overlapping area extends from the overlap end 152*c* to the overlap end 154*c*.

In the second embodiment, the first flange 142*a* and the second flange 142*b* are the same overall length, but are shorter than the main section 142*c*. Similarly, the first flange 144*a* and the second flange 144*b* are the same overall length, but are shorter than the main section 144*c*.

The first flange 142*a* and the second flange 142*b* of the first member 142 are attached via welds $W_1$ to corresponding ones of the first main flange 140*a* and the second main flange 140*b* of the main member 140. Similarly, the main section 142*c* of the first member 142 is welded to the main central section 140*c* of the main member 140 via welds $W_1$.

The first flange 144*a* and the second flange 144*b* of the second member 144 are attached via welds $W_2$ to corresponding ones of the first main flange 140*a* and the second main flange 140*b* of the main member 140. Further, various locations of the first member 142 are welded to the second member 144 via welds $W_3$.

Third Embodiment

Figure 15:
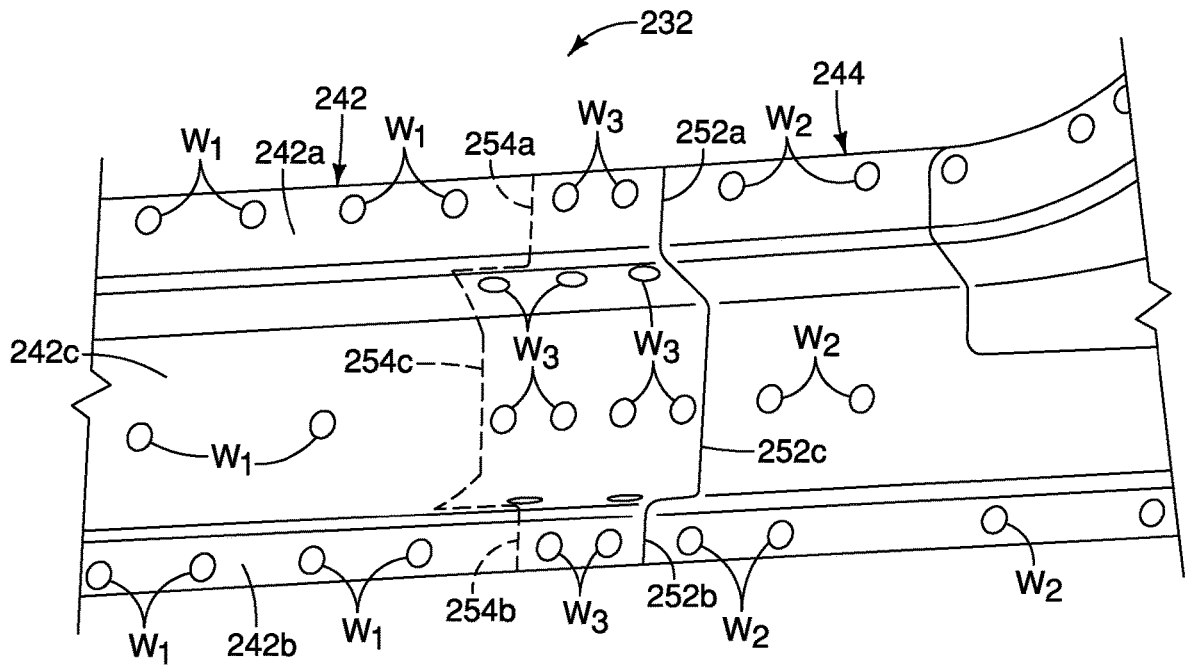
FIG. 15 is a side view of a portion of a sill assembly showing a first member and a second member overlapping one another and welded to one another defining an overlapping area in accordance with a third embodiment.
Figure 16:
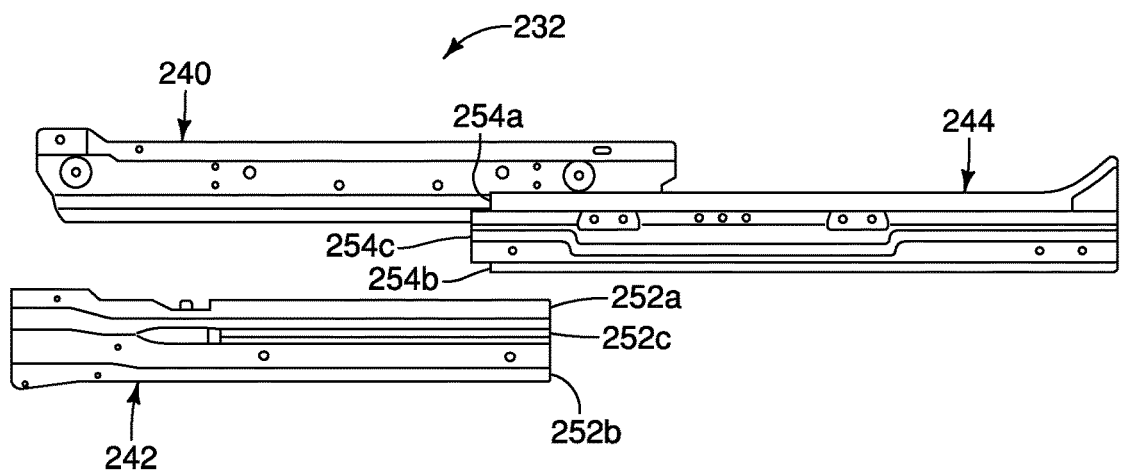
FIG. 16 is a side exploded perspective view of the sill assembly depicted in FIG. 15 showing a main member, the first member and the second member of the sill assembly in accordance with the third embodiment.

Referring now to FIGS. 15 and 16, a sill assembly 232 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The sill assembly 232 includes a main member 240, a first member 242 and a second member 244. The main member 240 is approximately the same as the main member 40 of the first embodiment. The main member 240 (FIG. 16) includes a first main flange 240*a*, a second main flange 240*b* and a main central section 240*c*. The main central section 240*c* has an overall U-shape. Each of the first main flange 240*a*, the second main flange 240*b* and the main central section 240*c* extends in a lengthwise direction $L_D$ of the sill assembly 232.

The first member 242 includes a first flange 242*a*, a second flange 242*b* and a central section 242*c*. A distal end of the first member 242 is provided with a predetermined overall shape. Specifically, the first flange 242*a* of the first member 242 has an overlap end 252*a*; the second flange 242*b* has an overlap end 252*b* and the central section 242*c* has an overlap end 252*c*. The central section 242*c* also has an overall U-shape. The central section 242*a*, the first flange 142*a* and the second flanges 142*b* all have the same overall length and are cut along a plane perpendicular to the side of the sill assembly 232 shown in FIG. 16. Hence, the overlap ends 152*a*, 152*b* and 152*c* are all aligned (even) with one another, as viewed from one side thereof.

The second member 244 includes a first flange 244*a*, a second flange 244*b* and a central section 244*c*. A distal end of the second member 244 is provided with a predetermined overall shape. Specifically, the first flange 244*a* of the second member 244 has an overlap end 254*a*; the second flange 244*b* has an overlap end 254*b* and the central section 244*c* has an overlap end 254*c*. The central section 244*c* also has an overall U-shape. The central section 244*a* is longer than both the first and second flanges 244*a* and 244*b*, such that the overlap ends 254*a* and 254*b* are offset from the overlap end 254*c* of the central section 244*a*. More specifically, the central section 244*a* has an overall length as measured from a rearward end thereof to the overlap end 254*c* that is greater than an overall length of the first and second flanges 244*a* and 244*b*, as measured from a rearward end thereof to the overlap ends 254*a* and 254*b*.

The main member 240 and the first member 242 are preferably made of a standard strength metallic material. The second member 244 is made of a high strength metal and can therefore be thicker that the main member 240 and the first member 242.

As shown in FIG. 15, the first member 242 and the second member 244 together define an overlapping area when the two are assembled and welded together. The overlapping area extends from the overlap end 252*c* to the overlap end 254*c*.

The first flange 242*a* and the second flange 242*b* of the first member 242 are attached via welds $W_1$ to corresponding ones of the first main flange 240*a* and the second main flange 240*b* of the main member 240. Similarly, the main section 242*c* of the first member 242 is welded to the main central section 240*c* of the main member 240 via welds $W_1$.

The first flange 244*a* and the second flange 244*b* of the second member 244 are attached via welds $W_2$ to corresponding ones of the first main flange 240*a* and the second main flange 240*b* of the main member 240. Further, various locations of the first member 242 are welded to the second member 244 via welds $W_3$.

Fourth Embodiment

Figure 17:
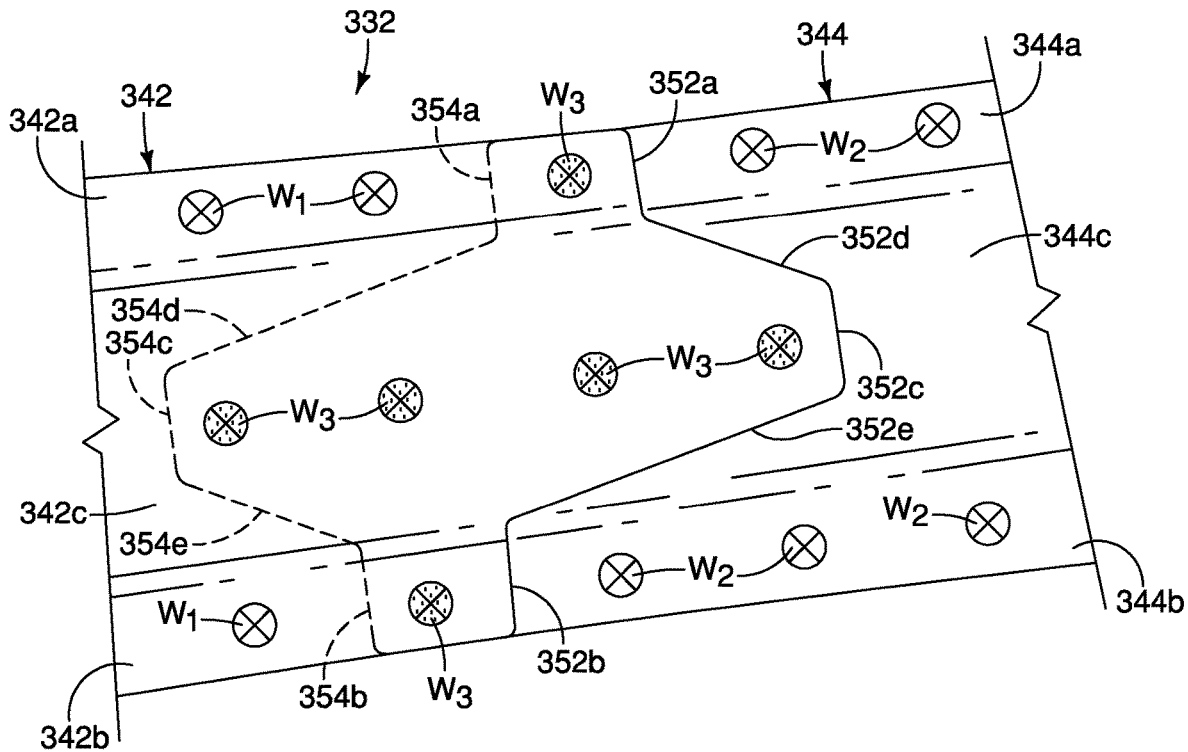
FIG. 17 is a side view of a portion of a sill assembly showing a first member and a second member overlapping one another and welded to one another defining an overlapping area in accordance with a fourth embodiment.
Figure 18:
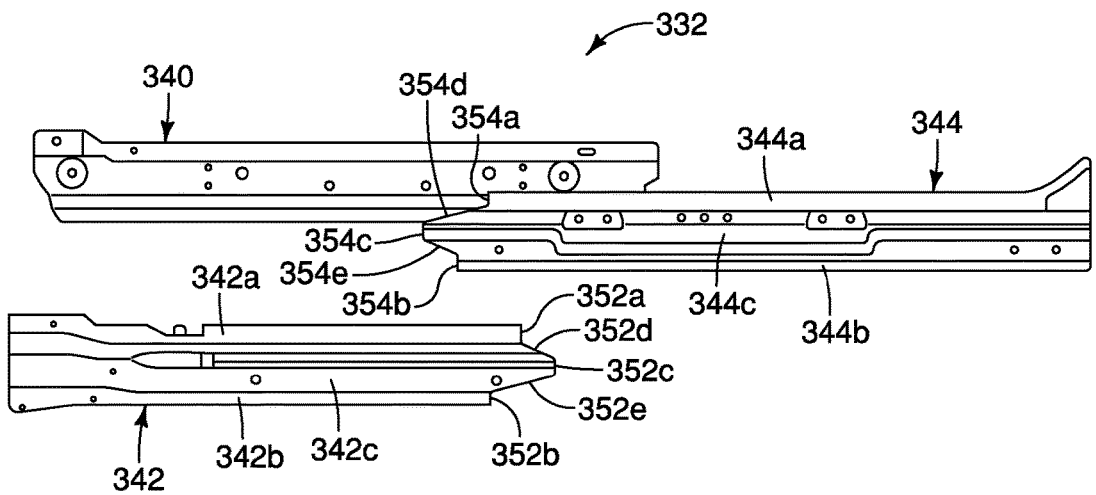
FIG. 18 is a side exploded perspective view of the sill assembly depicted in FIG. 17 showing a main member, the first member and the second member of the sill assembly in accordance with the fourth embodiment.

Referring now to FIGS. 17 and 18, a sill assembly 332 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

The sill assembly 332 includes a main member 340, a first member 342 and a second member 344. The main member 340 is approximately the same as the main member 40 of the first embodiment. The main member 340 (FIG. 18) includes a first main flange 340*a*, a second main flange 340*b* and a main central section 340*c*. The main central section 340*c* has an overall U-shape. Each of the first main flange 340*a*, the second main flange 340*b* and the main central section 340*c* extends in a lengthwise direction of the sill assembly 332.

The first member 342 includes a first flange 342*a*, a second flange 342*b* and a central section 342*c*. A distal end of the first member 342 is provided with a predetermined overall shape. Specifically, the first flange 342*a* of the first member 342 has an overlap end 352*a* (a distal end thereof when not attached to the second member 344); the second flange 342b has an overlap end 352b and the central section 342c has an overlap end 352c. The central section 342c also has an overall U-shape. The central section 342a is longer than both the first and second flanges 342a and 342b, such that the overlap ends 352a and 352b are offset from the overlap end 352c of the central section 342a, as viewed from the side in FIGS. 17 and 18. The central section 342a further includes a first angled edge 352d and a second first angled edge 352e. The overlap end 352c is located between the first angled edge 352d and the second first angled edge 352e.

The first angled edge 352d and the second first angled edge 352e are not the same. Specifically, the first flange 352a is longer than the second flange 352b. Hence, the first angled edge 352d has an overall length that is less than the overall length of the second angled edge 352e, as shown in FIG. 17.

The first angled edge 352d and the second first angled edge 352e extend along opposite sides of the U-shape of the central section 342c, being angled as the extend toward respective ones of the first and second flanges 342a and 342b. Put another way, the first angled edge 352d and the second first angled edge 352e converge toward one another approaching the overlap end 352c of the central section 342c.

The second member 344 includes a first flange 344a, a second flange 344b and a central section 344c. A distal end of the second member 344 is provided with a predetermined overall shape. Specifically, the first flange 344a of the second member 344 has an overlap end 354a; the second flange 344b has an overlap end 354b and the central section 344c has an overlap end 354c. The central section 344c also has an overall U-shape. The central section 344a is longer than both the first and second flanges 344a and 344b, such that the overlap ends 354a and 354b are offset from the overlap end 354c of the central section 344a. More specifically, the central section 344a has an overall length as measured from a rearward end thereof to the overlap end 354c that is greater than an overall lengths of both of the first and second flanges 344a and 344b, as measured from a rearward end thereof to the overlap ends 354a and 354b.

The central section 144a further includes a first angled edge 354d and a second first angled edge 354e. The overlap end 354c is located between the first angled edge 354d and the second first angled edge 354e.

The first angled edge 354d and the second first angled edge 354e are not the same. Specifically, the second flange 354b is longer than the first flange 354a. Hence, the first angled edge 354d has an overall length that is greater than the overall length of the second angled edge 354e, as shown in FIG. 17.

The first angled edge 354d and the second first angled edge 354e extend along opposite sides of the U-shape of the central section 344c, being angled as the extend toward respective ones of the first and second flanges 344a and 344b. Put another way, the first angled edge 354d and the second first angled edge 354e converge toward one another approaching the overlap end 354c of the central section 344c.

The main member 340 and the first member 342 are preferably made of a standard strength metallic material. The second member 344 is made of a high strength metal and can therefore be thicker that the main member 340 and the first member 342.

As shown in FIG. 17, the first member 342 and the second member 344 together define an overlapping area when the two are assembled and welded together. The overlapping area extends from the overlap end 352c to the overlap end 354c.

The first flange 342a and the second flange 342b of the first member 342 are attached via welds $W_1$ to corresponding ones of the first main flange 340a and the second main flange 340b of the main member 340. Similarly, the main section 342c of the first member 342 is welded to the main central section 340c of the main member 340 via welds $W_1$.

The first flange 344a and the second flange 344b of the second member 344 are attached via welds $W_2$ to corresponding ones of the first main flange 340a and the second main flange 340b of the main member 340. Further, various locations of the first member 342 are welded to the second member 344 via welds $W_3$.

Fifth Embodiment

Figure 19:
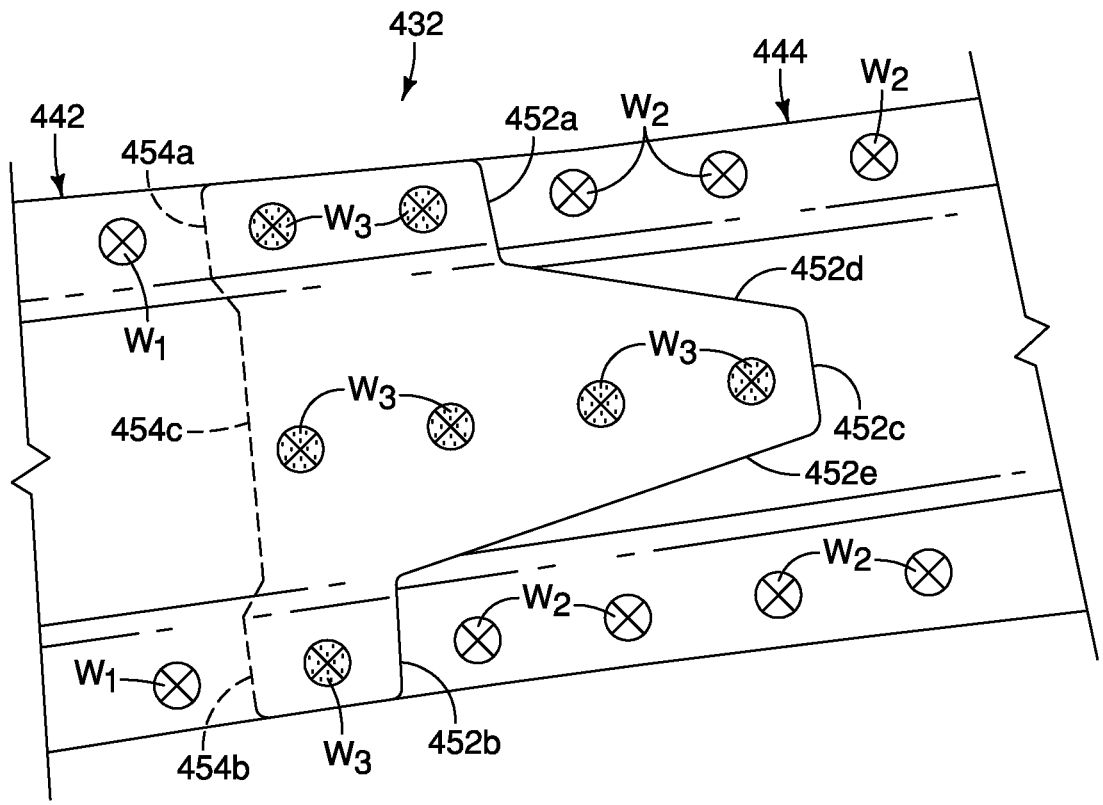
FIG. 19 is a side view of a portion of a sill assembly showing a first member and a second member overlapping one another and welded to one another defining an overlapping area in accordance with a fifth embodiment.
Figure 20:
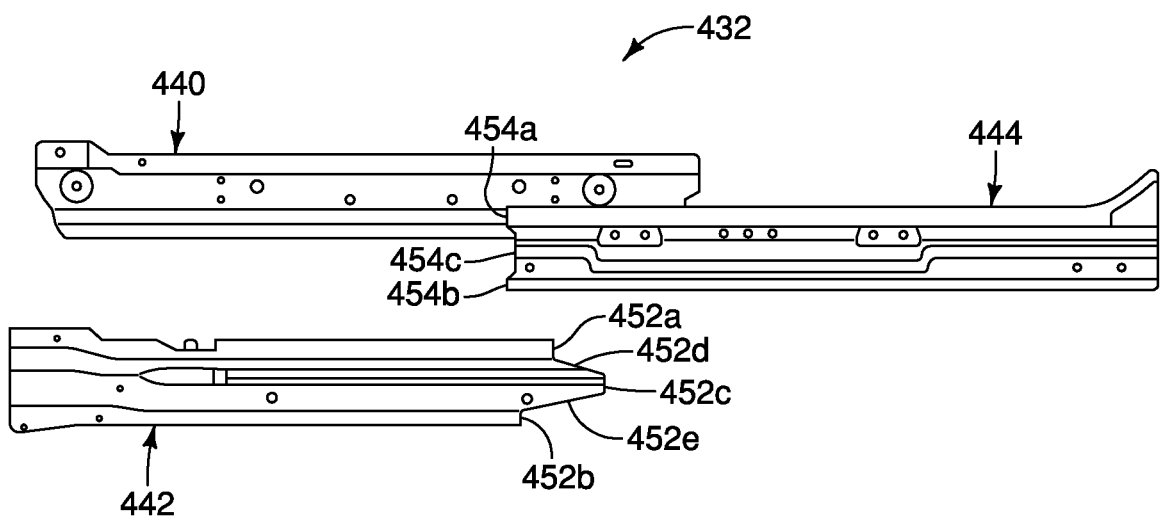
FIG. 20 is a side exploded perspective view of the sill assembly depicted in FIG. 19 showing a main member, the first member and the second member of the sill assembly in accordance with the fifth embodiment.

Referring now to FIGS. 19 and 20, a sill assembly 432 in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

The sill assembly 432 includes a main member 440, a first member 442 and a second member 444. The main member 440 is approximately the same as the main member 40 of the first embodiment. The main member 440 (FIG. 20) includes a first main flange 440a, a second main flange 440b and a main central section 440c. The main central section 440c has an overall U-shape. Each of the first main flange 440a, the second main flange 440b and the main central section 440c extends in a lengthwise direction of the sill assembly 432.

The first member 442 includes a first flange 442a, a second flange 442b and a central section 442c. A distal end of the first member 442 is provided with a predetermined overall shape. Specifically, the first flange 442a of the first member 442 has an overlap end 452a (a distal end thereof when not attached to the second member 444); the second flange 442b has an overlap end 452b and the central section 442c has an overlap end 452c. The central section 442a also has an overall U-shape. The central section 442a is longer than both the first and second flanges 442a and 442b, such that the overlap ends 452a and 452b are offset from the overlap end 452c of the central section 442a, as viewed from the side in FIGS. 19 and 20. The central section 442a further includes a first angled edge 452d and a second first angled edge 452e. The overlap end 452c is located between the first angled edge 452d and the second first angled edge 452e.

The first angled edge 452d and the second first angled edge 452e are not the same (not symmetrical). Specifically, the first flange 452a is longer than the second flange 452b. Hence, the first angled edge 452d has an overall length that is less than the overall length of the second angled edge 452e, as shown in FIG. 19.

The first angled edge 452d and the second first angled edge 452e extend along opposite sides of the U-shape of the central section 442c, being angled as the extend toward respective ones of the first and second flanges 442a and 442b. Put another way, the first angled edge 452d and the second first angled edge 452e converge toward one another approaching the overlap end 452c of the central section 442c.

The second member 444 includes a first flange 444a, a second flange 444b and a central section 444c. A distal end of the second member 444 is provided with a predetermined overall shape. Specifically, the first flange 444a of the second member 444 has an overlap end 454a; the second flange 444b has an overlap end 454b and the central section 444c has an overlap end 454c. The central section 444c also has an overall U-shape. The central section 444a, the first flange 444a and the second flange 444b are all the same overall length.

The main member 440 and the first member 442 are preferably made of a standard strength metallic material. The second member 444 is made of a high strength metal and can therefore be thicker that the main member 440 and the first member 442.

As shown in FIG. 19, the first member 442 and the second member 444 together define an overlapping area when the two are assembled and welded together. The overlapping area extends from the overlap end 452c to the overlap end 454c.

The first flange 442a and the second flange 442b of the first member 442 are attached via welds $W_1$ to corresponding ones of the first main flange 440a and the second main flange 440b of the main member 440. Similarly, the main section 442c of the first member 442 is welded to the main central section 440c of the main member 440 via welds $W_1$.

The first flange 444a and the second flange 444b of the second member 444 are attached via welds $W_2$ to corresponding ones of the first main flange 440a and the second main flange 440b of the main member 440. Further, various locations of the first member 442 are welded to the second member 444 via welds $W_3$.

Sixth Embodiment

Figure 21:
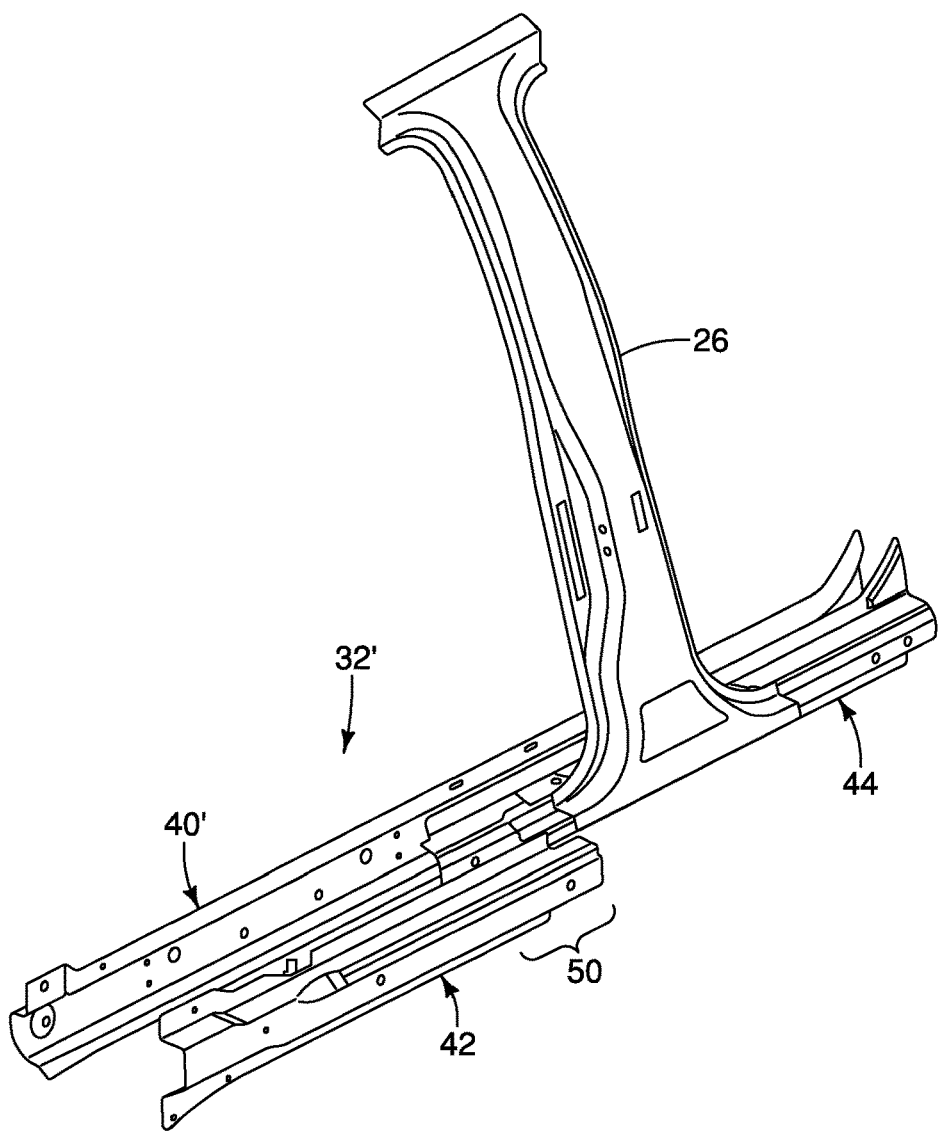
FIG. 21 is a perspective exploded view of a portion of a sill assembly showing a main member, a first member and a second member overlapping one another defining an overlapping area in accordance with a sixth embodiment.
Figure 22:
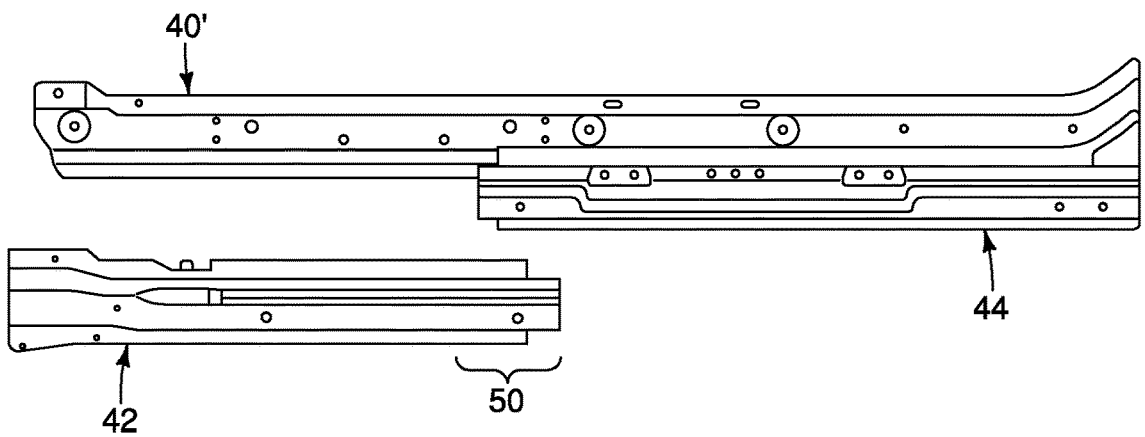
FIG. 22 is a side exploded perspective view of the sill assembly depicted in FIG. 21 showing a main member, the first member and the second member of the sill assembly in accordance with the sixth embodiment.

Referring now to FIGS. 21 and 22, a sill assembly 32' in accordance with a sixth embodiment will now be explained. In view of the similarity between the first and sixth embodiments, the parts of the sixth embodiment that are identical to the parts of the first embodiment will be given the same reference numerals as the parts of the first embodiment. Moreover, the descriptions of the parts of the sixth embodiment that are identical to the parts of the first embodiment may be omitted for the sake of brevity. The parts of the sixth embodiment that differ from the parts of the first embodiment will be indicated with a single prime (').

In the sixth embodiment, the sill assembly 32' includes an inner sill panel referred to as a main member 40', a first outer sill panel referred to as the first member 42 and a second outer sill panel referred to as the second member 44. The first member 42 is identical to the first member 42 of the first embodiment and the second member 44 is identical to the second member 44 of the first embodiment. The main member 40' is similar to the main member 40 of the first embodiment and includes all the features described above with the first embodiment, except that the main member 40' is longer than the main member 40. Specifically, the main member 40' extends from the base of the A-pillar 24 (see FIGS. 1-3) to the C-pillar 28. The main member 40' is a single panel without seams.

The first and second members 42 and 44 are welded together as described above with respect to the first embodiment.

The B-pillar 26 is attached to the second member 44 in the manner described above with respect to the first embodiment.

Seventh Embodiment

Figure 23:
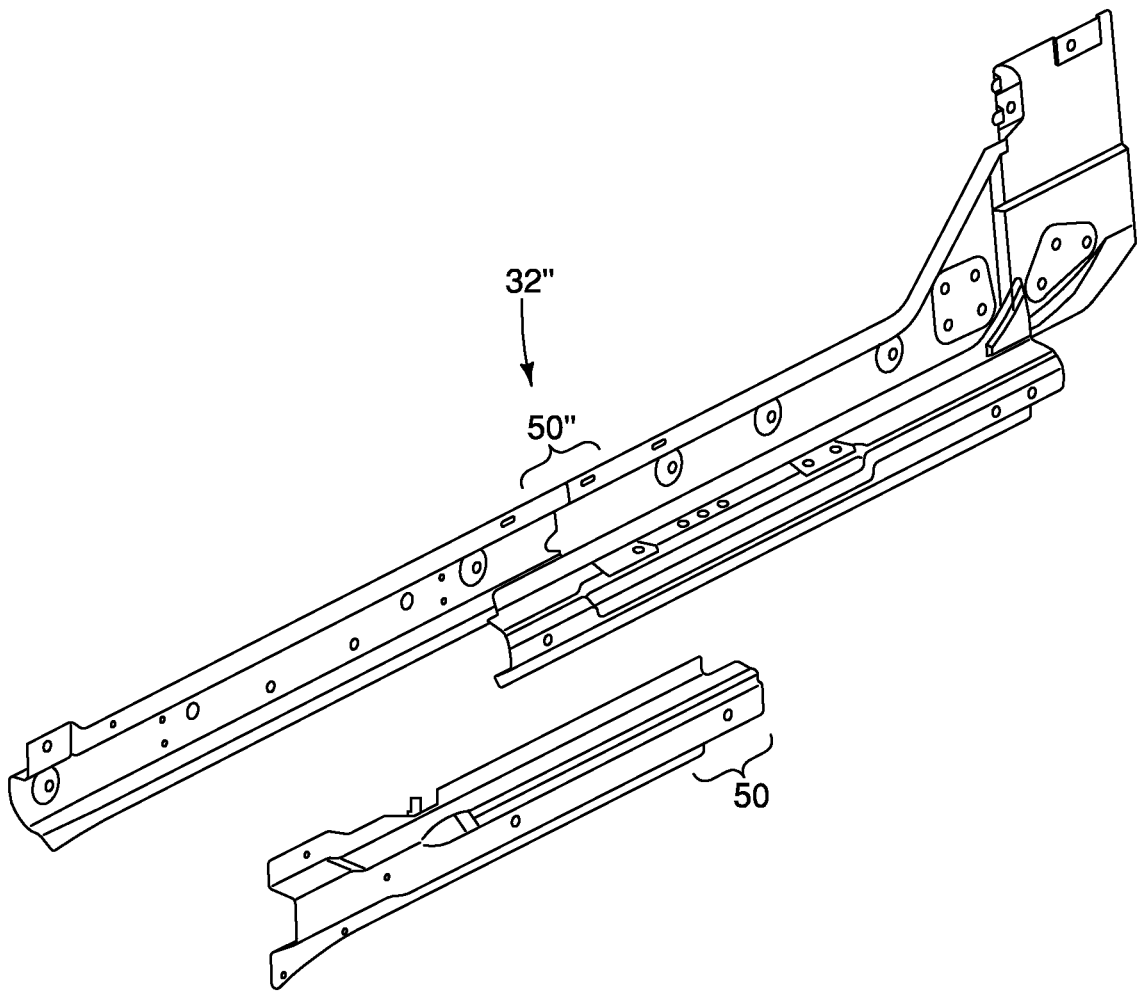
FIG. 23 is a perspective exploded view of a portion of a sill assembly showing a forward main member, a rearward main member, a first member and a second member, the first and second members overlapping one another defining a first overlapping area and the forward main member and rearward main member defining a second overlapping area offset from the first overlapping area in accordance with a seventh embodiment.
Figure 24:
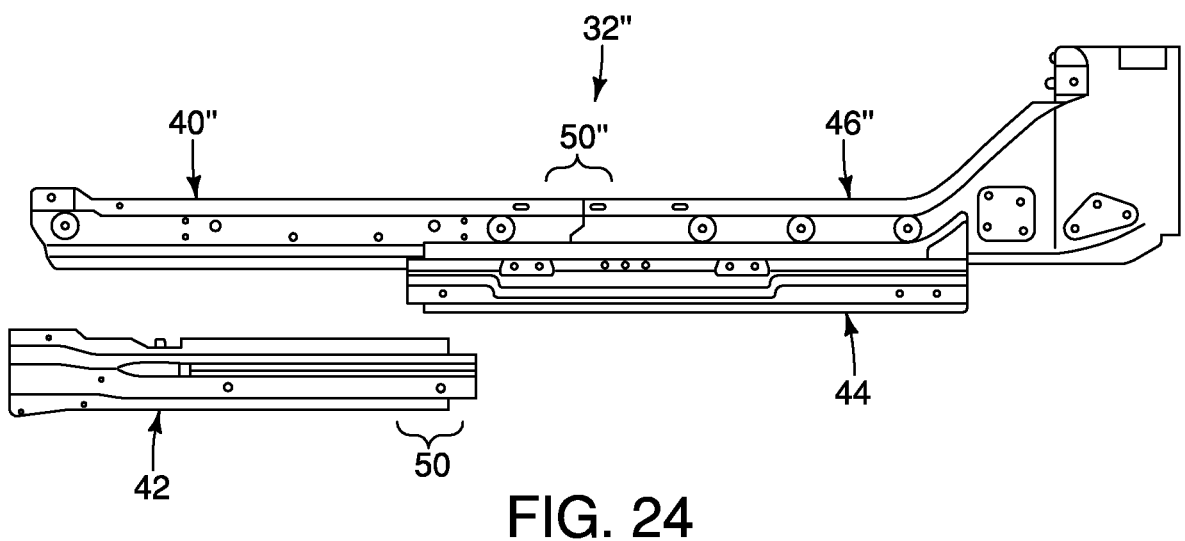
FIG. 24 is a side exploded perspective view of the sill assembly depicted in FIG. 23 showing the main member, the first member and the second member of the sill assembly in accordance with the seventh embodiment.

Referring now to FIGS. 23 and 24, a sill assembly 32" in accordance with a second embodiment will now be explained. In view of the similarity between the first and seventh embodiments, the parts of the seventh embodiment that are identical to the parts of the first embodiment will be given the same reference numerals as the parts of the first embodiment. Moreover, the descriptions of the parts of the seventh embodiment that are identical to the parts of the first embodiment may be omitted for the sake of brevity. The parts of the seventh embodiment that differ from the parts of the first embodiment will be indicated with a double prime (").

In the sixth embodiment, the sill assembly 32" includes a forward main member 40", a rearward main member 46", the first member 42 and the second member 44. The first member 42 is identical to the first member 42 of the first embodiment and the second member 44 is identical to the second member 44 of the first embodiment. The overlapping area 50 is defined by the overlapping surfaces of each of the first and second members 42 and 44 where they are welded together, as described above with reference to the first embodiment. The forward main member 40" is similar or identical to the main member 40 of the first embodiment and includes all the features described above with the first embodiment. The rearward main member 46" is welded to the main member 40" and extends from the main member 40" rearward to the C-pillar 28 (FIGS. 1, 2 and 3). The forward main member 40" and the rearward main member 46" are welded to one another such that contacting surfaces of the forward main member 40" and the rearward main member 46" define an overlapping area 50" that is offset from the overlapping area 50 defined by the first and second members 42 and 44. The overlapping area 50" can be designed with features similar to those that define the overlapping area 50.

As shown in FIG. 24, the overlapping area 50 is forward of the overlapping area 50". More specifically, the overlapping area 50 is forward of area where the B-pillar attaches to the second member 44 and the overlapping area 50" is located within the area where the B-pillar attaches to the second member 44.

The vehicle structures, other than the various embodiments of the sill assembly, are conventional components that are well known in the art. Since these vehicle structures are well known in the art, these structures will not be discussed or illustrated in detail herein. Rather, it will be apparent to those skilled in the art from this disclosure that the components can be any type of structure that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle structural assembly. Accordingly, these terms, as utilized to describe the present invention should be interpreted relative to a vehicle equipped with the vehicle structural assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle structural assembly, comprising:
   a main member having a first main flange, a second main flange and a main central section that extend in a lengthwise direction thereof;
   a first member having a first flange, a second flange and a first central section the first flange and the second flange extending along opposite sides of the first central section in a lengthwise direction thereof, the first central section defining a first overlapping area; and
   a second member having a third flange, a fourth flange and a second central section the third flange and the fourth flange extending along opposite sides of the second central section in a lengthwise direction thereof, the second central section defining a second overlapping area,
   the first and second flanges of the first member being attached to corresponding ones of the first main flange and the second main flange along a first section of the main member, the third and fourth flanges of the second member being attached to corresponding ones of the first main flange and the second main flange along a second section of the main member,
   the first overlapping area overlaying the second overlapping area such that the second overlapping area is positioned between the first overlapping area and a corresponding area of the main member, and
   at least one of the first overlapping area and the second overlapping area defining an overlap extension that extends from at least the one of the first central section and the second central section in a direction longitudinally away from end edges of a corresponding one of the first and second flanges, and, the third and fourth flanges.

2. The vehicle structural assembly according to claim 1, wherein
   the main central section, the first central section and the second central section each have an overall U-shape as viewed in cross-section.

3. The vehicle structural assembly according to claim 1, wherein
   the main member is an inner panel of a vehicle sill assembly, the first member is a forward outer panel of the vehicle sill assembly and the second member is a rearward outer panel of a vehicle sill assembly.

4. The vehicle structural assembly according to claim 1, wherein
   overall lengths of the first flange and second flange measured along the first member are equal.

5. The vehicle structural assembly according to claim 1, wherein
   overall lengths of the first flange and second flange measured along the first member are not equal.

6. The vehicle structural assembly according to claim 1, wherein
   the first flange has an overall first length measured along the first member, and the second flange has an overall second length measured along the first member, the first length being greater than the second length.

7. The vehicle structural assembly according to claim 1, wherein
   the first central section and the second central section each have an overall U-shape as viewed in cross-section.

8. The vehicle structural assembly according to claim 7, wherein
   at least one of the first overlapping area of the first central section of the first member and the second overlapping area of the second central section of the second member includes a pair of converging edge surfaces that extend toward a distal end of the one of the first overlapping area and the second overlapping area.

9. The vehicle structural assembly according to claim 8, wherein
   the other of the at least one of the first overlapping area and the second overlapping area has a straight end that is perpendicular to the longitudinal length of the other of the at least one of the first overlapping area and the second overlapping area.

10. The vehicle structural assembly according to claim 7, wherein
    the second overlapping area of the second central section of the second member includes a pair of converging edge surfaces that extend toward a distal end of the second overlapping area.

11. The vehicle structural assembly according to claim 1, wherein
    the first overlapping area overlays the second overlapping area such that the second overlapping area is positioned between the first overlapping area and the main member.

12. The vehicle structural assembly according to claim 11, wherein
    the first overlapping area is welded to the second overlapping area at a predetermined number of welding locations.

13. The vehicle structural assembly according to claim 12, wherein the first and second flanges are welded to respective ones of the third and fourth flanges along the first and second overlapping areas.

14. The vehicle structural assembly according to claim 13, wherein
the number of the predetermined number of welding locations is greater than a total number of welding locations between the first and second flanges, and, the respective ones of the third and fourth flanges.

15. The vehicle structural assembly according to claim 14, wherein
the first and second flanges are welded to corresponding ones of the first main flange and the second main flange at locations spaced apart from the first and second overlapping areas, and the third and fourth flanges are welded to corresponding ones of the first main flange and the second main flange at locations spaced apart from the first and second overlapping areas.

* * * * *